United States Patent
Axelrod et al.

[19]

[11] Patent Number: 5,950,568
[45] Date of Patent: Sep. 14, 1999

[54] FOLDABLE/COLLAPSIBLE STRUCTURE

[75] Inventors: Glen Axelrod, Neptune City, N.J.; Walter Lee, Norman Park, Australia

[73] Assignee: T.F.H. Publications, Neptune City, N.J.

[21] Appl. No.: 09/255,117

[22] Filed: Feb. 22, 1999

[51] Int. Cl.$^6$ ............................................. A01K 1/00
[52] U.S. Cl. ....................................................... 119/499
[58] Field of Search .................................. 119/431, 452, 119/461, 472, 474, 491, 498, 499, 504, 513, 514, 165, 168

[56] References Cited

U.S. PATENT DOCUMENTS

| | | | |
|---|---|---|---|
| 3,896,766 | 7/1975 | Martin | 119/17 |
| 4,006,713 | 2/1977 | Hawley, III | 119/19 |
| 4,169,428 | 10/1979 | Waugh | 119/1 |
| 4,195,593 | 4/1980 | Dunn | 119/19 |
| 4,467,572 | 8/1984 | Somers et al. | 52/70 |
| 4,520,758 | 6/1985 | Pfriender | 119/19 |
| 4,576,116 | 3/1986 | Binkert | 119/19 |
| 4,792,082 | 12/1988 | Williamson | 119/168 X |
| 4,903,637 | 2/1990 | Devault | 119/1 |
| 5,014,649 | 5/1991 | Taft | 119/168 |
| 5,078,096 | 1/1992 | Bishop et al. | 119/19 |
| 5,121,710 | 6/1992 | Gonzalez | 119/19 |
| 5,335,618 | 8/1994 | Zarola | 119/19 |
| 5,452,681 | 9/1995 | Ho | 119/17 |
| 5,465,686 | 11/1995 | Monetti et al. | 119/168 |
| 5,522,344 | 6/1996 | Demurjian | 119/474 |
| 5,564,454 | 10/1996 | Curley et al. | 135/126 |
| 5,626,098 | 5/1997 | Askins et al. | 119/474 |
| 5,669,331 | 9/1997 | Richmond | 119/497 |
| 5,727,502 | 3/1998 | Askins et al. | 119/499 |
| 5,752,470 | 5/1998 | Koneke | 119/499 |
| 5,769,028 | 6/1998 | Deckys | 119/496 |

FOREIGN PATENT DOCUMENTS

| | | |
|---|---|---|
| 03-66626 | 5/1990 | European Pat. Off. . |
| 74-2999 | 7/1998 | European Pat. Off. . |
| 97/47185 | 12/1997 | WIPO . |

*Primary Examiner*—Thomas Price
*Attorney, Agent, or Firm*—Hayes Soloway Hennessey Grossman & Hage PC

[57] ABSTRACT

A collapsible/foldable structure comprising a top roof and a bottom platform defining a top and bottom of the structure and a front and rear collapsible wall each pivotally attached to the bottom platform to provide for pivotable collapse of the front and rear walls. The structure further contains a pair of sidewalls each pivotally attached to the roof to facilitate inward collapse of said sidewalls when said sidewalls are pivoted toward the bottom platform. The sidewalls further contain an upper, middle and lower section, wherein the upper and middle sections are pivotally attached to one another and the middle and lower section are also pivotally attached to one another so that the upper and middle sidewall sections can be pivoted inwardly towards the bottom platform. Furthermore, the top roof section further comprises two roof sections pivotally attached to one another at about the mid-point of the roof section, so that the two roof sections can collapse downwardly along the pivotable attachment toward the bottom platform. The collapsible/foldable structure herein is particularly useful as a shelter for domestic pets and other small animals.

14 Claims, 6 Drawing Sheets

FOLDABLE/COLLAPSIBLE STRUCTURE

FIELD OF THE INVENTION

The present invention relates to a foldable/collapsible structure, and more particularly to a light-weight animal shelter having excellent thermal insulating features and ease of assembly/disassembly. The shelter can therefore be readily converted into a compact condition for ease of storage and/or transport, and also presents itself in an attractive or classic looking dog-house design when fully deployed.

PRIOR ART

A fair amount of disclosures have been put forward in recent years, seeking to develop a foldable/collapsible structure primarily for use as an animal shelter. More specifically, a number of pet houses and enclosures have been proposed with the purpose of providing a sleeping area for a pet and for confining a pet, when necessary, for example, when traveling.

However, these structures have all tended to be bulky, of relatively high weight, difficult to move from one location to another, and more importantly, not sufficiently foldable/collapsible for ease of storage and transport. Such prior art designs also have not considered the development of a structure that provides appropriate thermal insulation, to thereby provide the pet with comfortable shelter. In short, to date, existing dog houses have been difficult to construct, take up valuable space in distribution and at retail outlets, are difficult to transport for both the distributor and retailer, are difficult for consumers to transport home or to different locations, and are difficult for consumers to store when not in use.

For example, one early attempt at producing a collapsible animal cage is reported in U.S. Pat. No. 3,896,766, which discloses a collapsible animal cage formed of rectilinear welded wire fabric. The cage is said to have a front and rear rectangular end wall structure movable between an erected position and a folded position overlying a litter tray on the bottom of the cage, side wall structures intermediately hinged between their tops and bottoms and foldable over the end wall structures, and a top hingedly secured to the top of the side walls therein.

U.S. Pat. No. 4,903,637 discloses what is termed a "container" to house or carry small household pets, that may be quickly and manually formed between an erected use mode and a flat folded storage mode. The container is of a gable roofed house configuration in its erected mode and comprises an interconnected structure formed by hingeably related rigid planar elements that occupy a relatively small volume in the folded storage mode. Handles carried by the roof provide aid in manual carriage, and releasable fasteners maintain either an erected or storage mode, and en end wall provides a selectively latchable door.

U.S. Pat. No. 4,576,116 discloses a collapsible A-frame house providing a common site for a cat to rest, exercise and play comprised of a roof of carpet-like material including two integral roof panels with their bottom edges connected to opposing edges of a floor panel also of a carpet-like material. Stiffening panels are affixed onto the backside of the roof panels. A cord with two ends slidably passes through the peak into the house, with cat amusement objects connected to each end. The cord additionally provides a manual handle for lifting the house. Collapsing the house for storage or transport, the house is initially lifted by the cord adjacent the peak. The flexible nature of the floor panels permits an outward folding or buckling of the floor along its longitudinal centerline to thereby completely collapse the house into a folded condition.

U.S. Pat. No. 4,520,758 discloses an animal house which is particularly adaptable for use with cats. The house is formed of an elongated base adapted to stand substantially vertical and a platform at the upper end of the house to form an animal perch. The base is formed of a single piece of self-supporting material with appropriate fold lines being provided by either areas of weakening or by rigid material at the location of the fold lines or by appropriate hinges to permit folding. The base can be formed of three separate panels folded into a three-sided figure of triangular cross section.

U.S. Pat. No. 5,078,096 discloses a curvilinear, four-sided pyramidal container for housing and carriage of small household pets. The container provides a flexible fabric cover which defines optionally coverable mesh windows and an optionally coverable openable access door structure. The container carries a rigid bottom insert and is supported by a rod frame having a square, releasably interconnected bottom element formed of four interconnected semi-rigid rods and two arched, resiliently deformable support rods extending upwardly between opposed corners of the structure, all said rods carried in loops defined on the inner surface of the cover. The support rods are selectively removable to allow assembly and collapse of the structure for storage.

U.S. Pat. No. 5,121,710 discloses a collapsible doghouse to be used indoors or outdoors, to provide a comfortable and easy to clean place for a dog to rest or seek shade. The doghouse includes elongated side walls, a pair of distal walls, one of which includes an arched entranceway and another of which includes a cutout drainage slot, a roof portion, and a weightable base portion, all of which are securely, yet easily removably connected, and are formed of a substantially solid, yet flexible, water repellent plastic which will facilitate easy cleaning and drainage, and light-weight transportation.

U.S. Pat. No. 5,335,618 discloses a collapsible animal enclosure comprising a house unit with spaced side walls and a roof of pliable material, and opposite ends forming an enclosed area for housing an animal. Support bows extend transversely across the sidewalls and roof for holding the sidewalls and roof in an open, spread apart condition. The house unit can be collapsed between a fully erect condition and a collapsed condition in which the ends are pushed inwardly towards one another, collapsing a pliable material between the ends in an accordion-folded manner.

U.S. Pat. No. 5,425,681 discloses an animal house, including a cap, a base, four posts and four walls secured together. Both the cap and base include a groove formed in the inner peripheral portion, and the posts each include two slots for engaging with the edges of the walls so as to solidly secure the walls in place. The animal house may be folded into a compact configuration.

U.S. Pat. No. 5,465,686 discloses a disposable, collapsible pet house foldable from a unitary blank of material received in a flat state, the house being foldable from the blank between a collapsed state for shipping, storage and disposal and an enclosed, erect state for use.

U.S. Pat. No. 5,564,454 discloses a collapsible structure having front and back ends with front and back support members including a single central support member to pass in direct line along the cover means and thus support the entire structure at roughly the center of the cover means. The item may be sewn and easily manufactured in a fashion so that upon being collapsed it occupies the smallest possible volume and has no overlapping support members.

U.S. Pat. No. 5,626,098 discloses a collapsible cage for dogs or rabbits comprising a rectangular base, fold-down end walls and folding side walls and a roof. The walls and roof are made of metal grids. The end walls fold down onto the base one over the other. The sidewalls fold in the middle and are hinged at the top to opposite edges of the roof allowing the sidewalls and roof to collapse onto the base over the end walls. The base has a pull out tray and a pan and an access door is provided in one of the end walls. Releasable clips are provided to hold the walls and roof together in an elevated position of the structure.

U.S. Pat. No. 5,727,502 discloses a collapsible pet home having a base, side walls, end walls and a roof which can be converted into an exercise pen for the pet by folding the end walls down onto the base, setting the base on end, and using the base, side walls and roof to form peripheral walls of the exercise pen. The entire structure is said to fold down into a compact package.

U.S. Pat. No. 5,669,331 discloses a pet housing expandable to hold a pet and collapsible to suitcase size for manual transport including a pair of platforms and first and second pairs of spaced walls. The walls are pivotally attached at opposite ends of the platform and are hinged at intermediate positions for collapse and expansion.

U.S. Pat. No. 5,752,470 discloses a collapsible system which can be used for portable pet houses, as well as for emergency housing in ties of disaster. When using this system, the structure will collapse by pushing in the sides from the middle, and by letting the front and back fold onto each other.

U.S. Pat. No. 5,769,028 discloses a pet carrier including a main and insert unit. The main unit defines a carrying space having a closed bottom and four sides, one of which has an opening therethrough large enough to permit an animal to enter the space through the opening. The insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier.

U.S. Pat. No. 4,006,8713 discloses a collapsible dog house with two opposite side walls, a front wall, a rear wall, a roof and a floor which are separable components, preferably made of marine plywood. The floor and roof are provided with rectangular skirts. The sidewalls are notched and grooved to interfit with the skirts and front and rear walls. Interlocking means are provided on the two skirts so that when the skirts are in confronting abutment they define the perimeter of a case whose sides are the roof and floor of the dog house.

U.S. Pat. No. 4,109,427 discloses a foldable structure considered to be primarily useful as a doghouse. The structure is foldable between an expanded configuration in parallel sidewalls are connected by a top, a bottom and parallel ends and a folded configuration in which the side walls are adjacent to one another. In order to achieve a folding action, the top, bottom and the ends each consists of a set of two parts. The parts of each of these sets extend beyond the sidewalls. A first group of hinges are used to pivotally connect the parts of each of the sets to the sidewalls. The second group of hinges are employed to connect the parts of each set midway between the sidewalls.

U.S. Pat. No. 4,195,593 discloses a portable pet-house which defines an A-frame, the roof panel of which are pivoted at the top such that they are collapsible into a generally planar, carrying mode, preferably being floor and end wall members carried internally between the roof panels when the unit is in its portable mode.

U.S. Pat. No. 4,467,572 discloses a collapsible dwelling for animals, including a plurality of elements hingedly joined with each other which when in assembled relationship, cooperatively define an enclosure suitable for pets. All elements are hinged strategically since the elements can be partially disassembled and he aggregate parts stacked one upon the other, for inclusion within a container having a length and width no greater than that of the largest elements.

U.S. Pat. No. 4,169,428 discloses a sleeping bag for pets formed from a multiple ply padded sheet of deeply quilted material which is normally folded along its central portion with opposite halves in overlying relationship to form lower and upper layers and with the edge portions of each half in alignment with each other.

PCT Application No. WO 97/47185 discloses a house for feeding small animals, especially dogs or cats made of a folded section of cardboard or other foldable material with an essentially square lower section forming a bottom and side walls and a roof shaped upper section, where the lower section has an access aperture for the animal. The lower and upper sections are made in one piece from a folded section, where the upper section can be fitted on and secure the lower section where there is t least one removable inlay of corrugated cardboard or another absorbent material covering the bottom.

European Patent 0742 999B1 discloses an animal shelter, comprising a box having at least one strip curtain made of elastic material in front of an entrance to the box interior, characterized in that the strips are fastened in a releasable and in particular too-free, exchangeable manner in a clamp mounting which is fastened to the box.

Finally, European Patent Application 0 3667 626 A1 discloses a portable folding shelter for domestic animals. The shelter comprises a pair of sidewalls articulated at the top edges thereof to a respective sloping element in turn articulated to a central element, a rear and a front apertured wall articulated to the side edges of the sidewalls and each foldable along a middle vertical line, the roof of the shelter being provided with a withdrawing holding handle.

Accordingly, upon extensive review of the prior art noted above, it is apparent that a completely foldable, collapsible structure, suitable as a shelter for a pet, comprised of lightweight material having excellent thermal insulating features and ease of assembly/disassembly, remains generally unavailable. Therefore, it is an object to overcome the disadvantages of the structure noted above, which is more economical to manufacture and purchase, and which can readily be converted into a compact condition for ease of storage and/or transport and also presents itself in an attractive or classic-looking doghouse design when fully deployed.

Yet another object of this invention provide a foldable/collapsible structure suitable for a pet which simple to set up, take down and convert from one use to another.

SUMMARY OF THE INVENTION

A collapsible/foldable structure comprising a top roof and a bottom platform defining a top and bottom of said structure and a front and rear collapsible walls each pivotally attached to said bottom platform to provide for pivotable collapse of said front and rear walls. The structure further contains a pair of sidewalls each pivotally attached to said roof to facilitate inward collapse of said sidewalls when said sidewalls are pivoted toward said bottom platform. The sidewalls farther contain an upper, middle and lower section, wherein said upper and middle sections are pivotally attached to one another and said middle and lower section are also pivotally attached to one another so that said upper and middle sidewall sections can be pivoted inwardly towards said bottom platform. Furthermore, the top roof section further comprises two roof sections pivotally attached to one another at about the mid-point of said roof section, so that said two roof sections can collapse downwardly along said pivotable attachment toward said bottom platform.

DETAILED DESCRIPTION OF THE PREFERRED EMBODIMENTS

Figure 1:
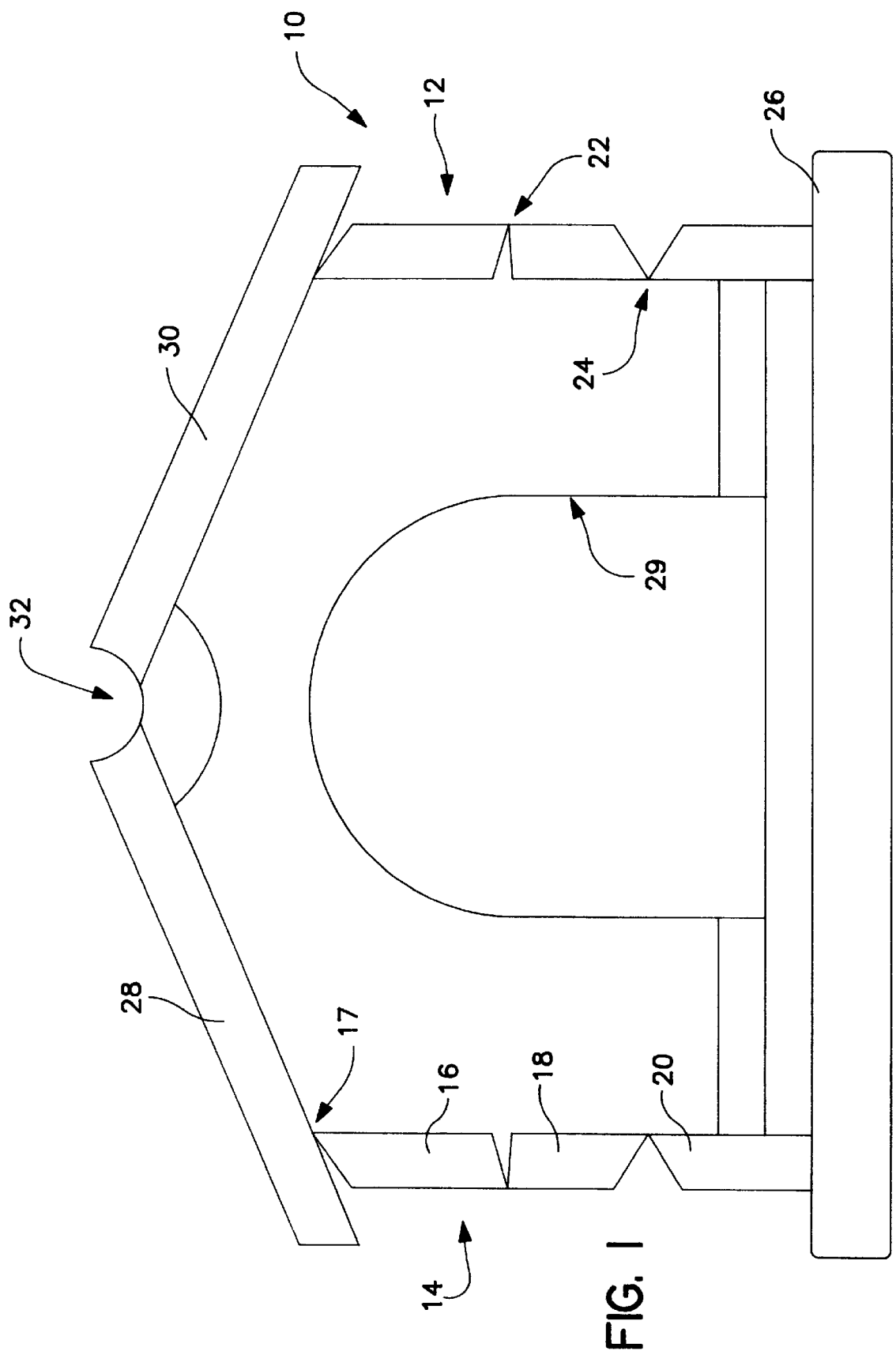
FIG. 1 is a front-end view of the collapsible/foldable structure of the present invention.

As illustrated in FIG. 1, the collapsible/foldable structure of the present invention is shown generally at 10, and comprising sidewalls 12 and 14. Sidewalls 12 and 14 contain an upper 16, middle 18 and lower section 20. As can be seen, the sidewalls contain a pivot 22 preferably disposed on the outer surface of the sidewalls 12 and 14, and a pivot 24, preferably disposed on the inside surface of the sidewall, such that when collapsing said sidewalls (see FIG. 2) the upper 16 and middle 18 sidewalls collapse inwardly and towards the bottom platform 26. In addition, upper sidewall 16 is pivotally attached to either roof section 28 and 30 at 17.

As also shown in FIG. 1, the collapsible/foldable structure 10 further contains a front wall 29 which preferably defines the front portal opening. Preferably, and as also shown in FIG. 1, the opening is of a portal/circular configuration of the classic pet-shelter or doghouse design. In addition, structure 10 further contains a top roof section comprising two roof sections pivotally attached to one another at 32, so that roof sections 28 and 30 can collapse downwardly along said pivotable attachment 32 toward said bottom platform 26.

Figure 2:
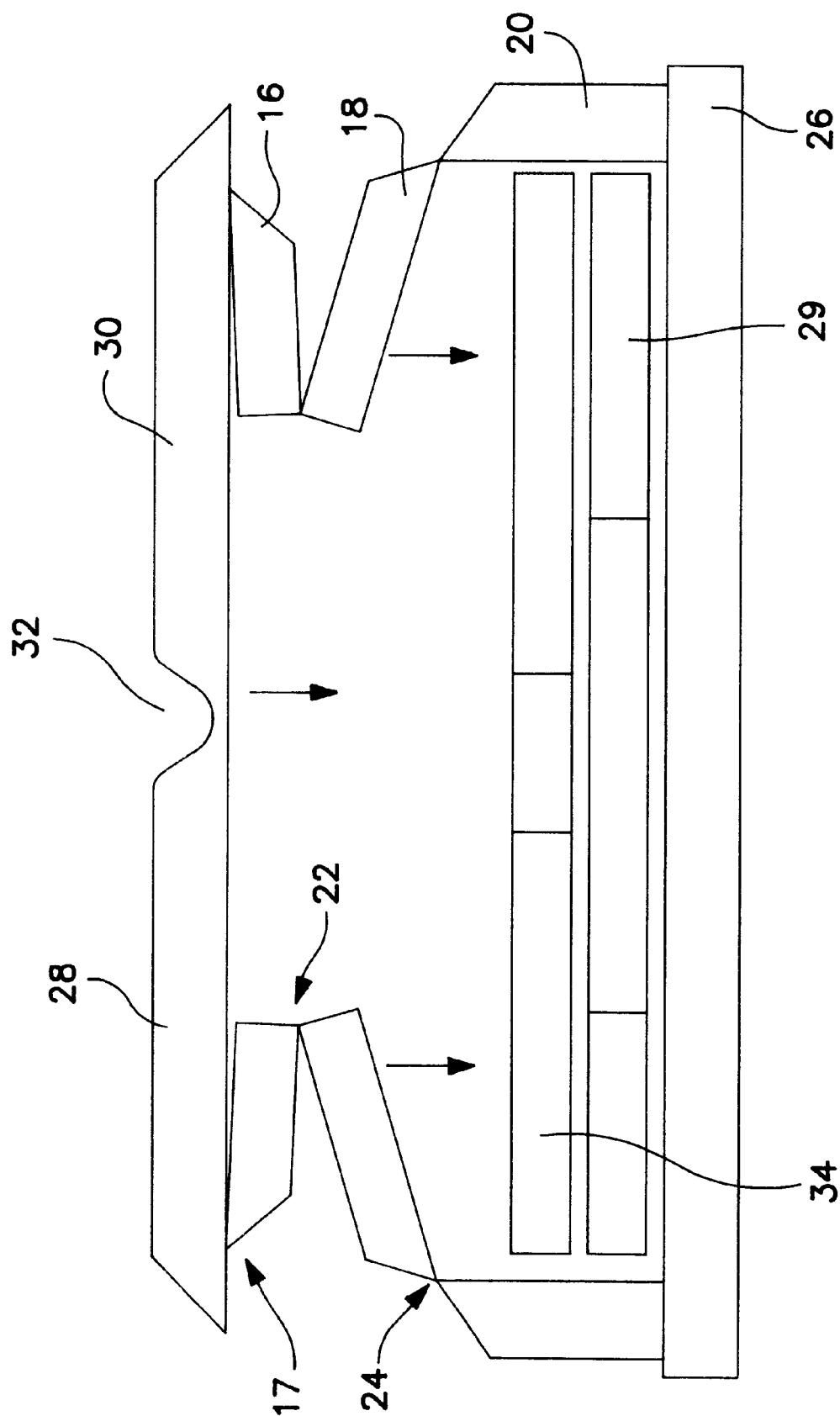
FIG. 2 is a front-end view of the collapsible/foldable structure of the present invention, in a partially collapsed/folded state.

In that regard, attention is directed to FIG. 2, which illustrates the collapsible/foldable structure of the present invention in a partially collapsed state. As illustrated therein, the upper 16 and middle sidewall sections are collapsed and disposed inward in the structure 10 and begin to assume the fully collapsed planar position, best illustrated in FIG. 3. Also, as shown in FIG. 2, preferably, front wall 29, which is pivotally attached to bottom section 26, is also made to collapse inwardly to rest on bottom section 26, and preferably, rear wall 34, which is also pivotably attached to bottom section 26, also collapses inwardly and rests upon front wall 29 when in a fully collapsed state. Those skilled in the art, however, will recognize that it may also be preferable to modify such pivotable attachment to facilitate the resting of front wall 29 on top of rear wall 34, when again, in a collapsed state.

In addition, as shown in FIG. 1, front wall 29 may contain, at a section disposed directly beneath pivot location 32, an opening, preferably of semi-circular configuration, to facilitate ventilation of the structure. Such opening can also be optionally placed in the rear wall 34.

Figure 3:
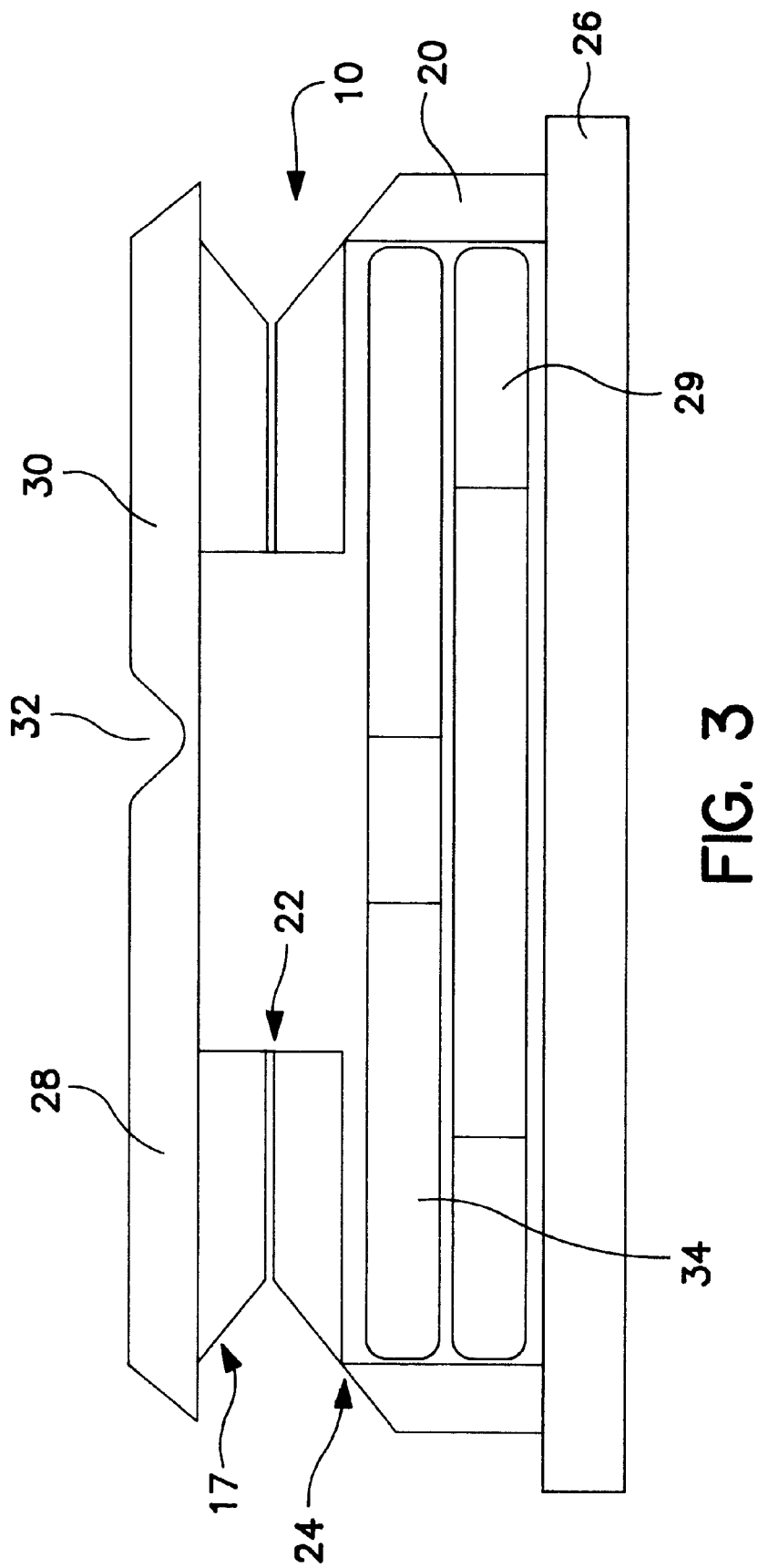
FIG. 3 is a front-end view of the collapsible/foldable structure of the present invention, in a fully collapsed/folded state.

Attention is next directed to FIG. 3, which illustrates the present invention in a fully collapsed condition. As can be seen in FIG. 3, the interaction of pivot points 17, 22, 24, as well as the inward collapse of the front 29 and rear collapsible walls 34 which are pivotally attached to the bottom section 26 provide the unique and previously unavailable ability to collapse the classic pet shelter design illustrated in FIG. 1 into a substantially flat, readily transportable structure.

Figure 4:
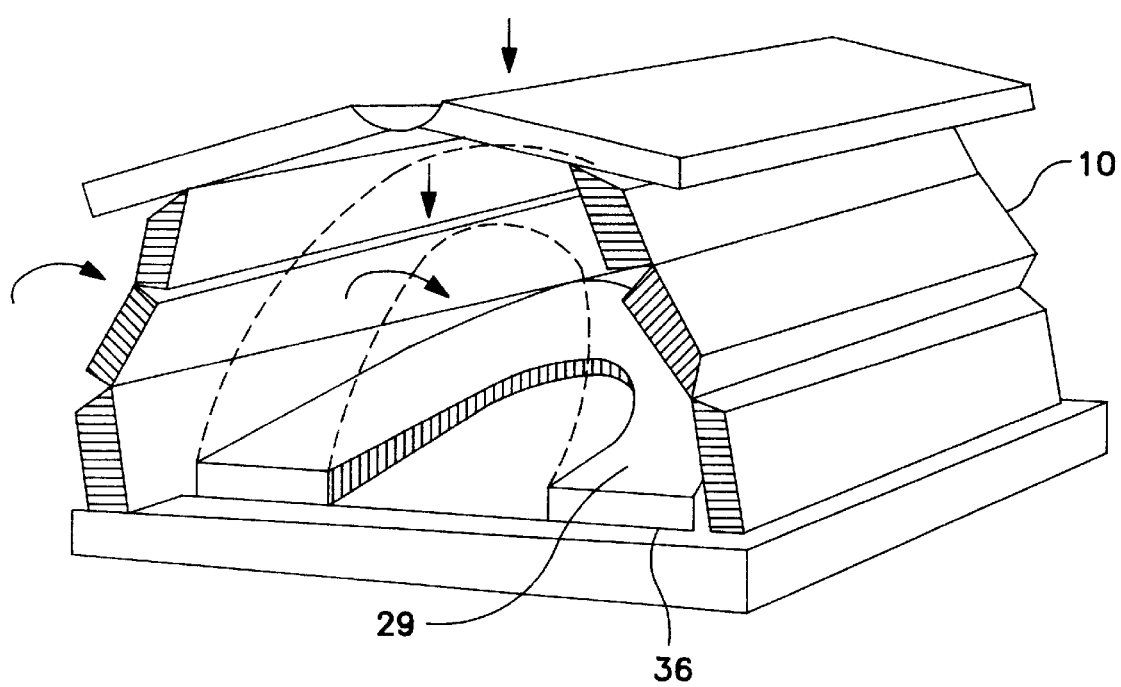
FIG. 4 is a front/side view of the collapsible/foldable structure of the present invention, in a partially collapsed/folded state.

Turning next to FIG. 4, as better illustrated therein, front wall 29 is shown as pivoting inwardly into structure along pivot edge 36. With attention next directed to FIG. 5, structure 10 is shown in cut-away view with respect to bottom section 26. More specifically, bottom section 26 preferably contains a hollow section 38 in which sand or other weight or load material can be incorporated, to strategically add weight to the bottom section to facilitate placement stability. In addition, as also shown in FIG. 5, the structure 10 may optionally contain an attached chimney type feature, which in preferred embodiment, is configured to contain a solar-powered fan so that the animal or pet inside shelter 10 is treated to improved ventilation.

In addition, in preferred embodiment, it can be appreciated that certain exposed surface of shelter 10 may be vulnerable to chewing and destruction by a pet, and therefore, should preferably be protected from such action by the strategic placement of protection material. In that regard, attention is again directed to FIG. 5, wherein exposed and/or overhanging surfaces 38 of the roof section or front entrance are preferably protected with a layer of material that restricts the ability of the animal to chew on such exposed surfaces and destroy the structure. Accordingly, exposed surfaces are preferably further protected with plastic sheeting materials, including, but not limited to polyolefins, vinyl polymers, styrene based polymers, acrylonitrile-butadiene-styrene resins, vinyl polymer resins, engineering thermoplastics, and thermoset type resins or coatings which would all provide the necessary barrier to chewing destruction of an animal.

Figure 5:
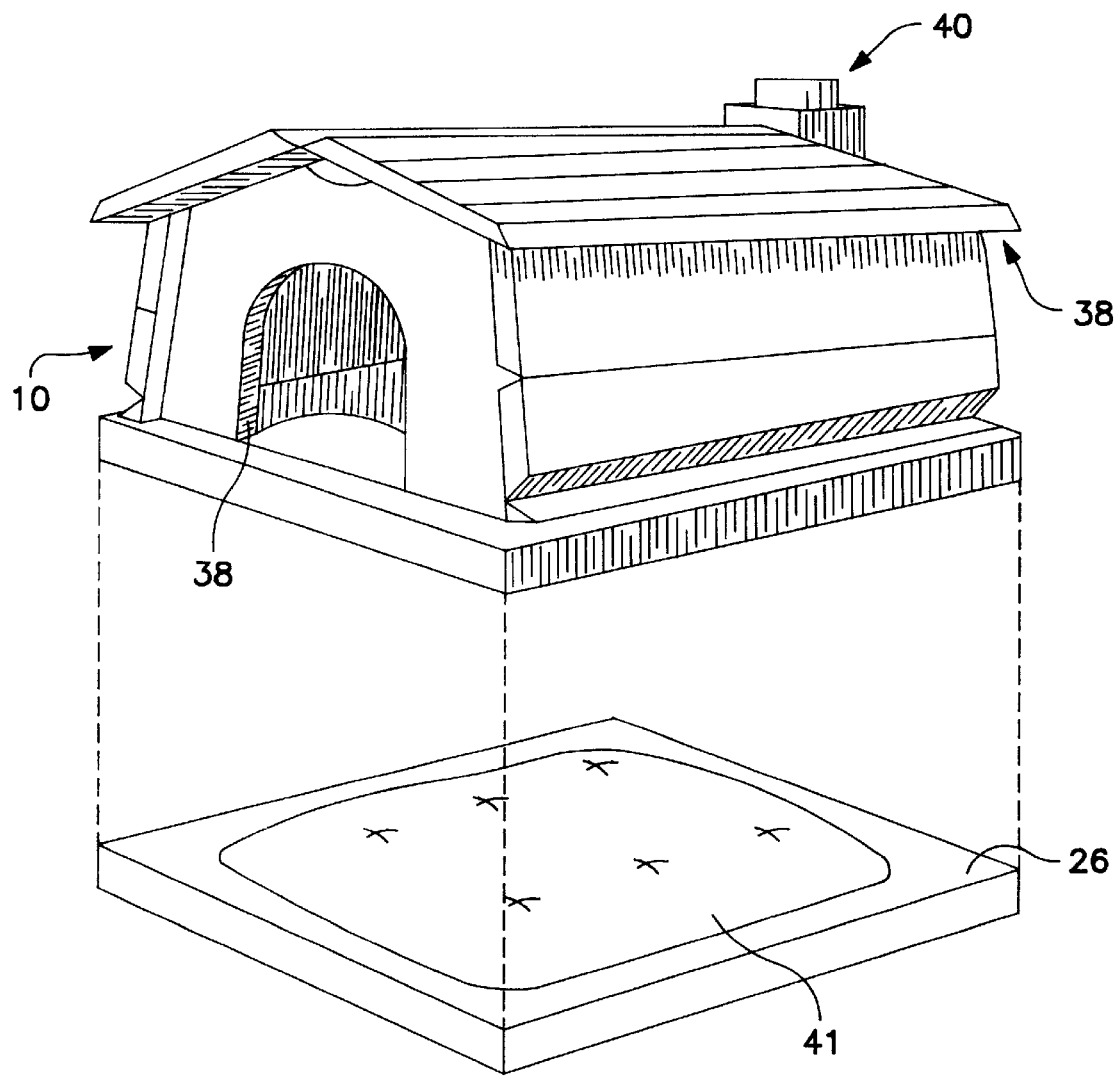
FIG. 5 is an exploded side/front view of the collapsible/foldable structure of the present invention, illustrating an optional clip-on chimney feature with solar-powered fan.

In addition, as also illustrated in FIG. 5, preferably, bottom platform 26 preferably contains a hollow section 41 for the incorporation of a ballast material, such as sand, to improve the weight of structure 10 for purposes of positioning stability. Alternatively, bottom platform can be made from a material that is itself of greater weight relative to the sidewall and/or roof section.

With all of the above in mind, it is herein disclosed that preferably, the materials employed for the structure 10 are first selected from those materials that provide thermal insulation, and accordingly, include expanded type polymer materials, preferably foam materials, optionally containing a film type surface. Along those lines, and again with reference to FIG. 1, roof sections 28 and 30, as well as sidewall sections 16, 18 and 20, front wall section 29, rear wall section 34, and bottom platform 26 are all preferably made from expanded polymeric foam material, such as expanded or foamed polystyrene material, which foam material may contain an film surface of high-impact polystyrene. In addition, other foam materials are suitable, including but not limited to polyurethane type foam materials, polyurea/urethane, polyurea, trimer foam, etc. Accordingly, in broad embodiment, any synthetic foam material that provides thermal insulation and temperature control of the interior of the foldable/collapsible structure will be suitable for construction of the present invention.

Furthermore, the above identified sections of FIG. 1 can also be suitably prepared from non-foamed plastic material, or, for that matter, plastic material which provides a void or null space between sections thereof, which would also similarly provide thermal insulation characteristics. Moreover, the structure of the present invention can be prepared from structural type foam material, which, is preferably made from engineering type plastic resins such as polycarbonate resin. As those skilled in the art are aware, structural foam material, while perhaps not as efficient as expanded or cellular type foam material, still can provide thermal insulation efficiency, while at the same time, structural integrity to the various compents (sidewalls, bottom platform, roof section) of the present invention.

In addition, it is also possible to prepare structure 10 out of material made from such techniques as gas-assisted injection molding. Such process, which preferably makes use of gases such as nitrogen, provides an inert gas to the interiors (null space) of the sidewalls 12 and 14, roof sections 28 and 30, front wall 29 and rear wall 34. In addition, said structural components can also be made hollow and optionally contain common thermal insulation media such as fiberglass or cellulose type material.

When foam material is employed in the present invention, it has also been found preferable to include, on the outer layer of the foam (i.e., that surface exposed to weather) a film protective layer that prevents weather damage to the foam layer, and also provides a better or improved cosmetic appearance. That is, those skilled in the art will appreciate that the film layer can be made to assume a wood-like grain appearance, such that the structure 10 takes on the appearance of a wood structure, which is cosmetically pleasing to the consumer. In that regard, a particularly preferred embodiment centers on the use of expanded polystyrene foam for the structure 10, and an outer film layer, also of is polstyrene resin.

On that note, the outer film material can also conveniently serve as an integral type hinge material. For example, pivots 32, 17, 22 and 24, as shown in FIG. 1, can of course, comprise an add-on standard type hinge construction, and can therefore be of sufficient number (running, along the length of the structure) to effectuate the foldable/collapsible mechanism herein described. Alternatively, said pivots can also run the entire length of the structure, and be made of a polyolefin (polypropylene), which therefore provides a living-hinge characteristic to the present invention. Again, the living hinge can be either a non-integral feature of the roof, sidewalls, and bottom section (i.e. an add-on), or, alternatively, can be integral to said structural components as illustrated in the drawings.

Figure 6:
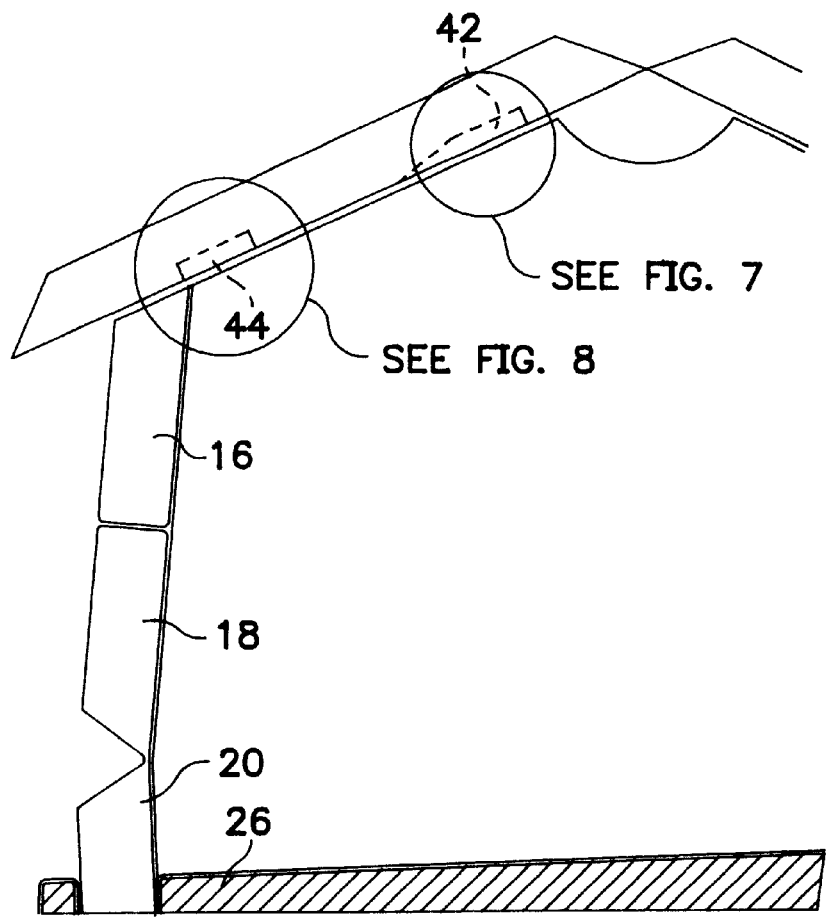
FIG. 6 is an exploded view of the optional assembly recess and location recess for improved stability of the foldable/collapsible structure when in assembled condition.
Figure 7:
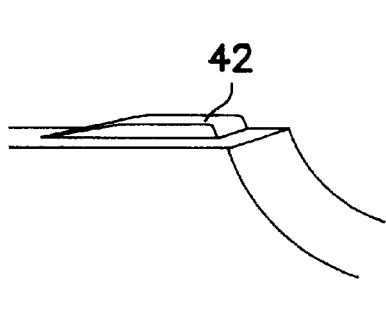
FIGS. 7 & 8 are exploded views of appropriately identified designated sections of FIG. 6.
Figure 8:
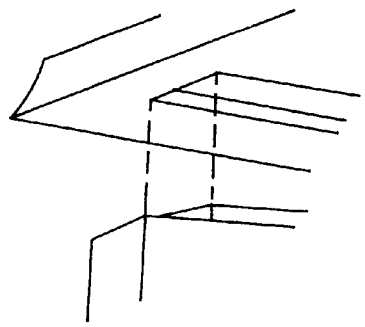

Finally, attention is directed to FIGS. 6–8, which illustrates, among other things, that in preferred embodiment, bottom sidewall section 20 is made to rest within bottom platform 26. In addition, preferably, the front and rear walls are made to contain a location recess 42 and an assembly recess 44. Accordingly, those skilled in the art will appreciate that the location recess 42 and assembly recess 44 will, in optional embodiment, improve and lock roof sections 28 and 30 to said front and rear side wall sections, thereby providing improved, but by no means necessary, structural integrity to the collapsible/foldable structure of the present invention.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims:

We claim:

1. A collapsible/foldable structure comprising:

a top roof and a bottom platform defining a top and bottom of said structure;

front and rear collapsible walls each pivotally attached to said bottom platform to provide for pivotable collapse of said front and rear walls;

said front wall having an opening for egress and ingress of an animal;

a pair of sidewalls each pivotally attached to said roof to facilitate inward collapse of said sidewalls when said sidewalls are pivoted toward said bottom platform, said sidewalls further containing an upper, middle and lower sections, wherein said upper and middle sections are pivotally attached to one another and said middle and lower sections are also pivotally attached to one another so that said upper and middle sidewall sections can be pivoted inwardly towards said bottom platform;

and wherein said top roof further comprises two roof sections pivotally attached to one another at about the mid-point of said roof, so that said two roof sections can collapse downwardly along said pivotable attachment toward said bottom platform;

said sidewalls contain an outer and an inner surface thereof, and wherein said upper and middle sidewalls are pivotally attached only by a continuous outer surface of said sidewalls.

2. A collapsible/foldable structure comprising:

a top roof and a bottom platform defining a top and bottom of said structure;

front and rear collapsible walls each pivotally attached to said bottom platform to provide for pivotable collapse of said front and rear walls;

said front wall having an opening for the egress and ingress of an animal;

a pair of sidewalls each pivotally attached to said roof to facilitate inward collapse of said sidewalls when said sidewalls are pivoted toward said bottom platform, said sidewalls further containing an upper, middle and lower sections, wherein said upper and middle sections are pivotally attached to one another and said middle and lower sections are also pivotally attached to one another and said middle and lower section are also pivotally attached to one another so that said upper and middle sidewall sections can be pivoted inwardly towards said bottom platform;

and wherein said top roof further comprises two roof sections pivotally attached to one another at about the mid-point of said roof, so that said two roof sections can collapse downwardly along said pivotable attachment toward said bottom platform;

said sidewalls contain an outer and an inner surface thereof, and wherein said middle and lower sections are pivotally attached only by a continuous inner surface of said sidewalls.

3. The structure of claim 1, wherein said top roof, bottom platform, pair of sidewalls, and said front and rear walls are made from a thermal insulating polymeric foam material.

4. The structure of claim 3 wherein said foam material is expanded polystyrene foam.

5. The structure of claim 4, wherein said foam material is polyurethane foam.

6. The structure of claim 4, wherein said foam material further contains a protective film coating.

7. The structure of claim 1, wherein said top roof, bottom platform, pair of sidewalls, and said front and rear walls are made of a plastic material.

8. The structure of claim 1, wherein said top roof, bottom platform, pair of sidewalls, and said front and rear walls are made of a structural foam material.

9. The structure of claim 1, wherein said bottom platform contains a hollow region thereof, and said hollow region is filled with ballast material.

10. The structure of claim 1, wherein said sidewalls, pivotally attached to said roof to facilitate inward collapse, are pivotally attached substantially along a length of said sidewalls, and said pivotal attachment comprises a living hinge.

11. The structure of claim 1, wherein said upper and middle sections pivotally attached to one another, are pivotally attached substantially along a length of said sidewalls, and said pivotal attachment comprises a living hinge.

12. The structure of claim 1, wherein said middle and lower sections that are pivotally attached to one another are pivotally attached substantially along a length of said sidewalls, and said pivotal attachment comprises a living hinge.

13. The structure of claim 1, wherein said two roof sections pivotally attached to one another at about the mid-point of said roof section, are pivotally attached along a length of said sidewalls, and said pivotal attachment comprises a living hinge.

14. The structure of claim 1, wherein said pair of sidewalls contain a outer integral skin layer, which skin layer provides for said pivotal attachment between said upper and middle sections as well as pivotal attachment between said middle and lower sidewall sections.

* * * * *

UNITED STATES PATENT AND TRADEMARK OFFICE
CERTIFICATE OF CORRECTION

PATENT NO. : 5,950,568
DATED : September 14, 1999
INVENTOR(S) : Axelrod et al

It is certified that error appears in the above-identified patent and that said Letters Patent is hereby corrected as shown below:

Title Page: Item [75], "NORMAN PARK" should be - -QUEENSLAND- -.

Signed and Sealed this

Twenty-ninth Day of February, 2000

Attest:

Q. TODD DICKINSON

Attesting Officer

Commissioner of Patents and Trademarks